US011211706B2

(12) United States Patent
Wiklund et al.

(10) Patent No.: US 11,211,706 B2
(45) Date of Patent: Dec. 28, 2021

(54) WIRELESS RANGE EXTENDER

(71) Applicant: QUALCOMM Incorporated, San Diego, CA (US)

(72) Inventors: Magnus Olov Wiklund, San Jose, CA (US); Mehrbod Mohajer Jasebi, San Jose, CA (US); Andrew Friefeld, Scotts Valley, CA (US); Kapil Rai, Sunnyvale, CA (US); Syed Hussain, Fremont, CA (US); Volodimir Veremey, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 108 days.

(21) Appl. No.: 16/228,715

(22) Filed: Dec. 20, 2018

(65) Prior Publication Data

US 2020/0203828 A1 Jun. 25, 2020

(51) Int. Cl.
*H01Q 21/28* (2006.01)
*H01Q 3/44* (2006.01)
*H01Q 5/385* (2015.01)
*H01Q 3/36* (2006.01)
*H01Q 9/04* (2006.01)

(52) U.S. Cl.
CPC .............. *H01Q 3/446* (2013.01); *H01Q 3/36* (2013.01); *H01Q 5/385* (2015.01); *H01Q 9/04* (2013.01); *H01Q 21/28* (2013.01)

(58) Field of Classification Search
CPC ............ H01Q 3/446; H01Q 3/36; H01Q 3/24; H01Q 3/2605; H01Q 3/2652; H01Q 5/385; H01Q 9/04; H01Q 21/28; H04B 1/0458
See application file for complete search history.

(56) References Cited

U.S. PATENT DOCUMENTS

| 6,987,493 | B2 * | 1/2006 | Chen ..................... H01Q 1/246 343/893 |
|---|---|---|---|
| 7,180,464 | B2 | 2/2007 | Chiang et al. |
| 8,362,968 | B2 | 1/2013 | Fukuda |
| 8,928,541 | B2 | 1/2015 | Desclos et al. |
| 9,123,986 | B2 | 9/2015 | Shamblin et al. |
| 9,401,542 | B2 | 7/2016 | Autti et al. |
| 9,413,065 | B2 | 8/2016 | Caimi et al. |
| 9,559,756 | B2 | 1/2017 | Desclos et al. |

(Continued)

OTHER PUBLICATIONS

International Search Report and Written Opinion—PCT/US2019/061360—ISA/EPO—dated Feb. 24, 2020.

(Continued)

*Primary Examiner* — Awat M Salih
(74) *Attorney, Agent, or Firm* — MG-IP Law, P.C.

(57) ABSTRACT

Systems and methods are directed to configuring antenna systems. An antenna system may be coupled to a first communication unit and may be responsive to another communication unit. The first communication unit may alter its antenna system to accommodate various attributes of both units. The first communication unit may have a plurality of antennae which may be configured to be driven actively, deactivated completely, or tuned and driven in a parasitic mode. By configuring the antenna system, the range of the antenna system may be increased, the power to drive the antenna system may be decreased, and other various attributes of the communication system may be accommodated.

11 Claims, 10 Drawing Sheets

(56) References Cited

U.S. PATENT DOCUMENTS

| | | | |
|---|---|---|---|
| 2004/0150568 A1* | 8/2004 | Chiang | H01Q 9/30 |
| | | | 343/702 |
| 2016/0204520 A1 | 7/2016 | Dong et al. | |
| 2018/0351255 A1* | 12/2018 | Singh | H01Q 5/378 |
| 2020/0343866 A1* | 10/2020 | Deguchi | H03F 1/565 |

OTHER PUBLICATIONS

Harrington R.F., "Reactively Controlled Directive Arrays," IEEE Transactions on Antennas and Propagation, May 1978, vol. 26, No. 3, pp. 390-395.

* cited by examiner

WIRELESS RANGE EXTENDER

FIELD OF DISCLOSURE

Disclosed aspects are directed to communication systems. More specifically, exemplary aspects are directed to extending the range of wireless systems efficiently.

BACKGROUND

Antenna systems are commonly thought of as fixed hardware components of a communication system. Advantages can, however, be gained by viewing the antenna system as a cooperating component of the overall communications chain. Industry factors such as miniaturization of components, the desire to conserve power in portable systems, the desire to maximize communication range, the push to higher carrier frequencies, and particularly the availability of increasing processor power make it worthwhile to examine methods to improve antenna system performance.

SUMMARY

Exemplary aspects of the invention are directed to systems, apparatus and methods of antenna system design.

In one exemplary embodiment a method of controlling an antenna system configuration to provide a satisfactory communication link with a target is disclosed. The method comprises turning on a first powered antenna, thereby entering a first antenna system configuration. The method further comprises determining if the first antenna system configuration can provide the satisfactory communication link with the target; and if the first antenna system configuration cannot provide the satisfactory communication link entering a second antenna system configuration, wherein in addition to the first powered antenna at least one directionally tuned parasitic antenna is used to form a portion of a reactively directed array in order to steer an antenna system beam towards the target.

In another embodiment a configurable antenna array is disclosed. The configurable antenna array comprises at least one antenna coupled to a first power amplifier; and at least one tunable parasitic antenna, The at least one tunable parasitic antenna is tuned to form part of a directed array in order to steer a configurable antenna array beam towards a target.

In a third exemplary embodiment a processor and a memory system configured to execute the method set forth herein is disclosed.

BRIEF DESCRIPTION OF THE DRAWINGS

The accompanying drawings are presented to aid in the description of aspects of the invention and are provided solely for illustration of the aspects and not limitation thereof.

DETAILED DESCRIPTION

Aspects of the teachings herein are disclosed in the following description and related drawings directed to specific aspects of this disclosure. Alternate aspects may be devised without departing from the scope of the teachings herein. Additionally, well-known elements of the system disclosed will not be described in detail or will be omitted so as not to obscure the relevant details of the disclosure.

The word "exemplary" is used herein to mean "serving as an example, instance, or illustration." Any aspect described herein as "exemplary" is not necessarily to be construed as preferred or advantageous over other aspects.

The terminology used herein is for the purpose of describing particular aspects only and is not intended to be limiting. As used herein, the singular forms "a," "an," and "the" are intended to include the plural forms as well, unless the context clearly indicates otherwise. It will be further understood that the terms "comprises" "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer-readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Figure 1:
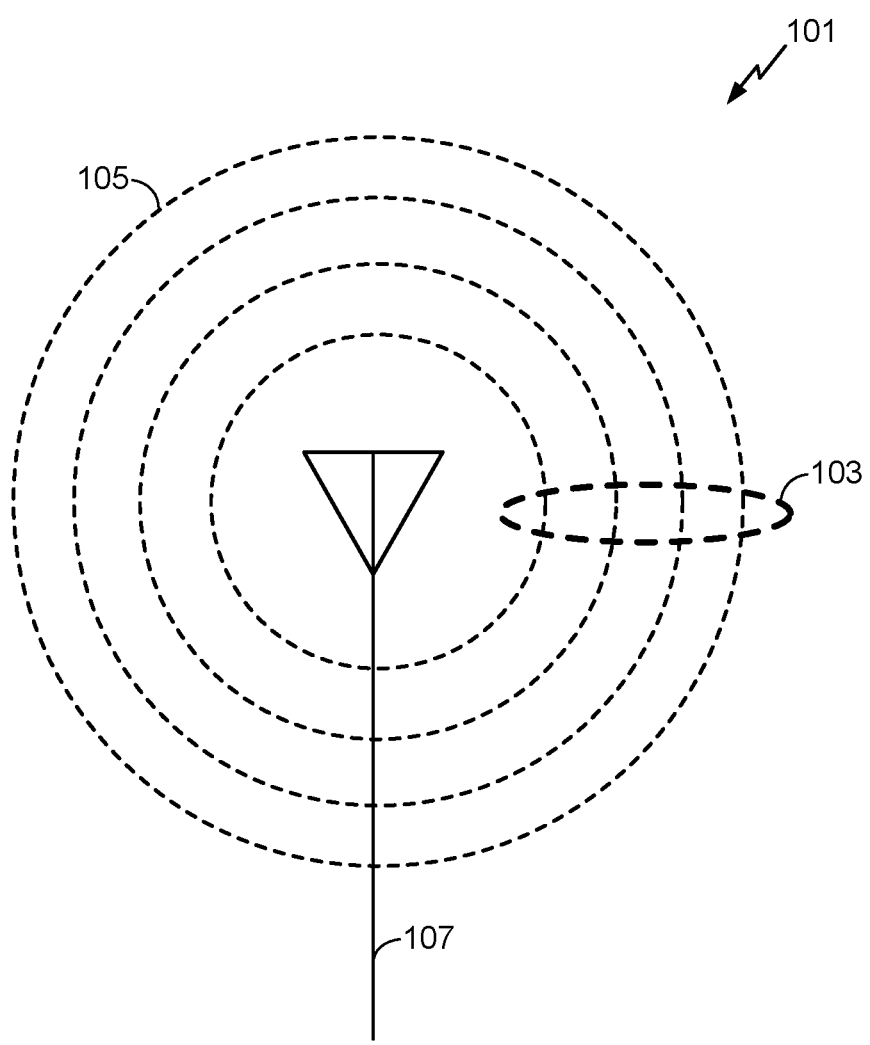
FIG. 1 is an illustration of a single antenna radiating a signal.

FIG. 1 is an illustration of a single antenna system 101 radiating a signal 103. The concentric dotted circles 105 that surround antenna 107 represent peaks of a transmitted waveform. A single antenna 107 will generally transmit waveforms as seen in FIG. 1.

Figure 2:
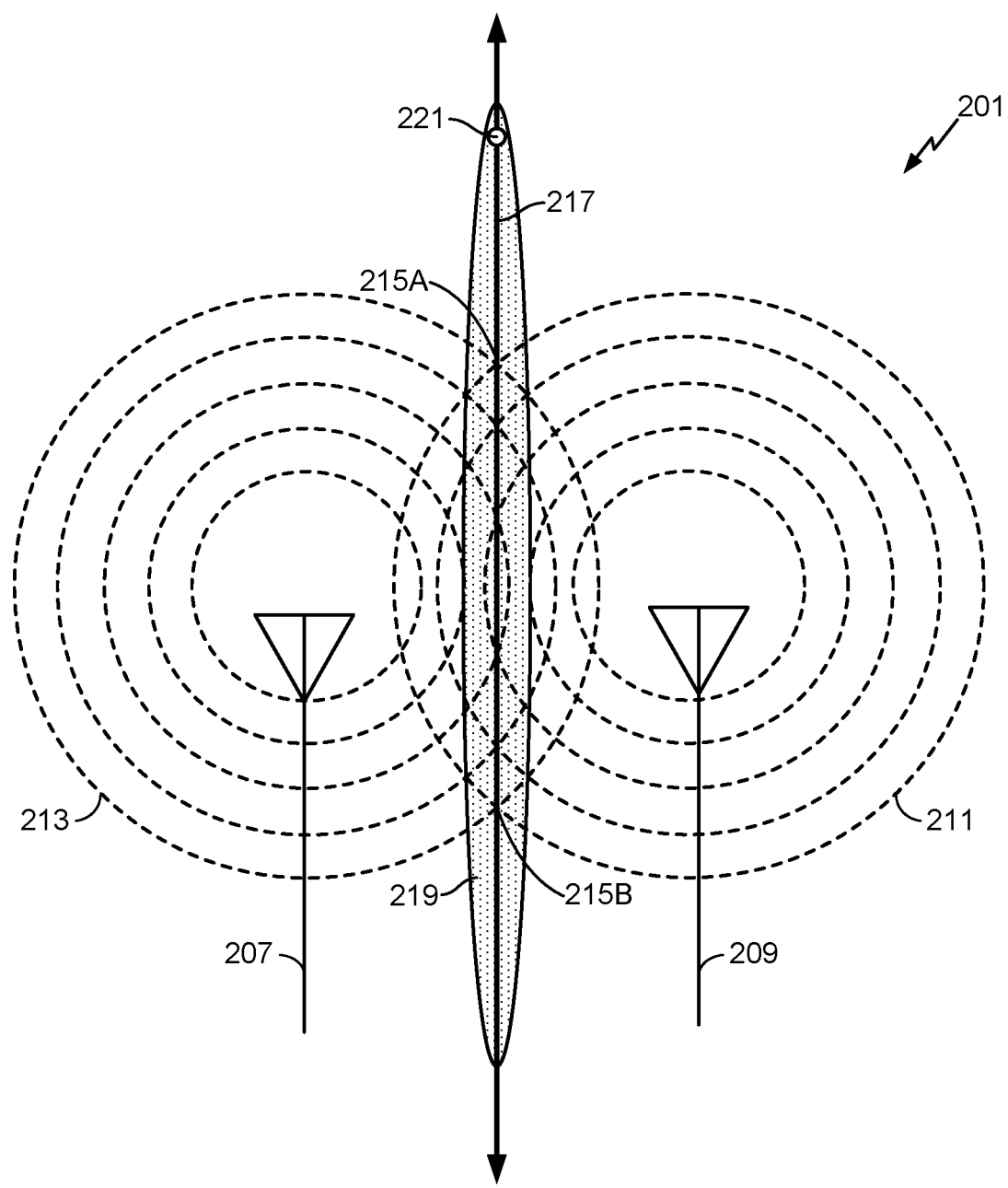
FIG. 2 is an illustration of a two antenna system radiating signals.

FIG. 2 is an illustration of a two antenna system 201 radiating signals. For purposes of illustration both antennas 207 and 209 are radiating signals of the same frequency. When two or more antennas are radiating signals of the same frequency, they interfere with each other. For the purposes of this disclosure there are two types of interference with respect to radiating signals. The first type of interference is called destructive interference. Destructive interference occurs when a maximum of one signal is at the same point in space and time as the minimum of a second signal. Assuming that signals are of equal strength, the maximum of one signal will cancel out the minimum of the second signal, resulting in no signal. Constructive interference occurs when a maximum of one signal is at the same point in space and time as the maximum of a second signal. Assuming that the signals are equal strength, resulting signals will have double the amplitude of either signal. A maximum wave front 213 from an antenna 207, and a maximum wave front 211 from antenna 209, will constructively interfere with each other producing a maximum at points 215a and 215b. Points 215a and 215b are at a midpoint 217 between antennas 207 and 209. In the example illustrated in FIG. 2, the midpoint 217 is equally distance between antennas 207 and 209 because antennas 207 and 209 are radiating signals of the same phase in this example.

Because of this constructive interference, the strongest signal from antennas 207 and 209 will lie in zone 219, which for the purposes of this disclosure shall be referenced as the constructive interference zone or beam. In the constructive interference zone 219 the combined signal from antennas 207 and 209 will be stronger than at any other place equally distance from either antenna 207, 209. Because signal is strongest in the constructive interference zone 219 if a point is in the constructive interference zone, such as point 221 is, it will receive essentially the strongest signal that is the product of constructive interference. For the purposes of this disclosure, we will assume that any points in a constructive interference zone, as drawn, will receive adequate signal to be properly decoded by a receiver such as point 221, which is in the constructive interference zone 219. Accordingly a signal received by a receiver in the constructive interference zone 219 can receive that signal with less overall system transmission power from antennas 207 and 209 than if it were out of that zone. It is therefore desirable from a signal strength standpoint and a transmitted power standpoint that any receiver be in the constructive interference zone 219. The constructive interference zone 219 is sometimes referred to as a beam, because it is along that line, or beam, that the highest signal strength signal will be found. It is obviously advantageous to have a receiver in the beam of the transmitter to try to maximize a received signal. It is further advantageous for the transmitter to be able to steer the beam towards a target in order to increase the received signal power by the target.

Figure 3:
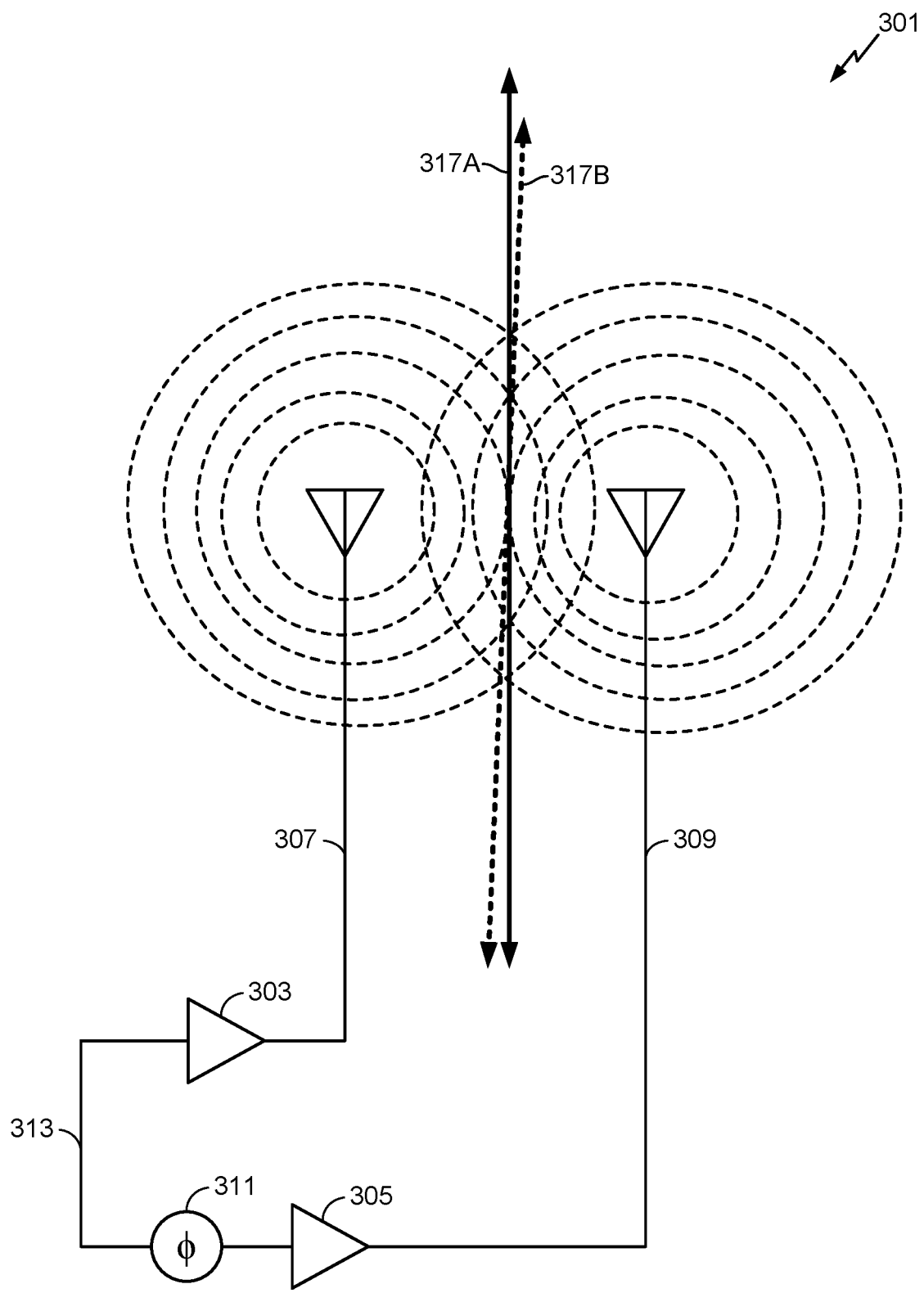
FIG. 3 is an illustration of a two antenna system radiating signals one of which is phase delayed.

FIG. 3 is an illustration of a two antenna system 301 radiating signals one of which is phase delayed. In FIG. 3, a signal to be transmitted 313 is coupled to a two antenna system 301. The signal to be transmitted 313 is coupled into power amplifier 303 and subsequently into antenna 307. The signal 313 is also coupled into a phase shifter 311 and then further coupled into power amplifier 305 and then further coupled into antenna 309. For the sake of simplicity, we shall assume that both antennas 307 and 309 receive signals of the same magnitude. When the phase shifter 311 is at 0° the midline of the constructive interference zone (or beam) of the two antennas 307 and 309 is as illustrated at 317a. When a phase delay is introduced by the phase shifter 311, antenna 309 will receive a signal that is phase delayed from the signal 313 received by antenna 307. As a consequence of the phase delay, the midline of the beam shifts as shown in 317b. By shifting the phase delay, the center line of the beam can be shifted as shown in 317b, and pointed in a different direction. This allows the beam to be directed or pointed at a receiver or other desired point. This process is commonly known as beam steering.

Figure 4:
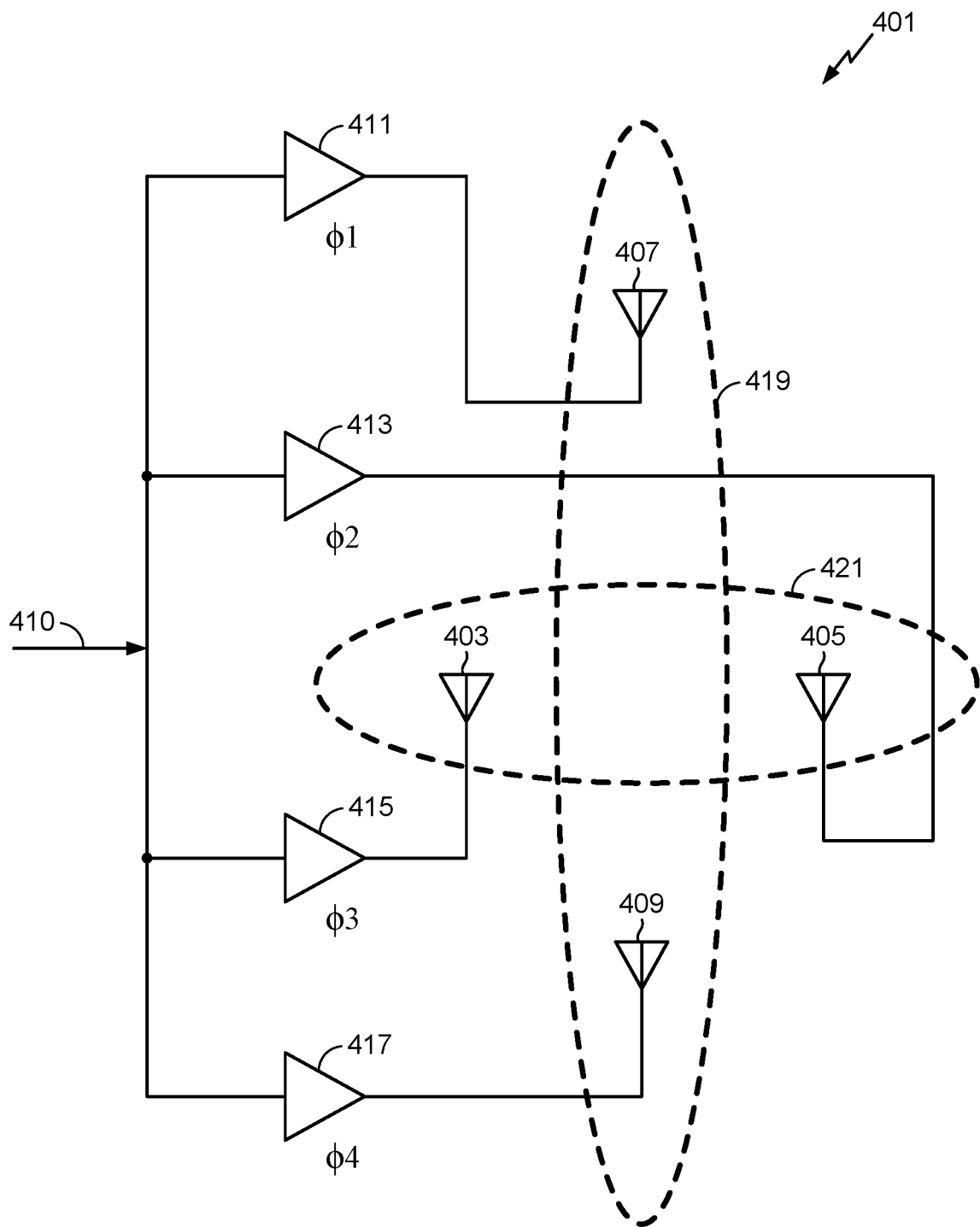
FIG. 4 is an illustration of a four antenna system such as may be used for 3-dimensional beam steering.

FIG. 4 is an illustration of a four antenna system 401 such as may be used for 3-dimensional beam steering. In FIG. 4, antennas 403, 405, 407 and 409 are driven by power amplifiers 415, 413, 411, and 417, respectively. Each of the power amplifiers 415, 413, 411, and 417 contain phase shifters, which are not explicitly illustrated. A signal to be broadcast 410 is coupled into power amplifiers 415, 413, 411, and 417. Zones of constructive interference 419 and 421 result. By changing phase delay of the power amplifiers 415, 413, 411, and 417, the zones of constructive interference 419 and 421 can be adjusted, and hence can be steered in two dimensions.

Figure 5:
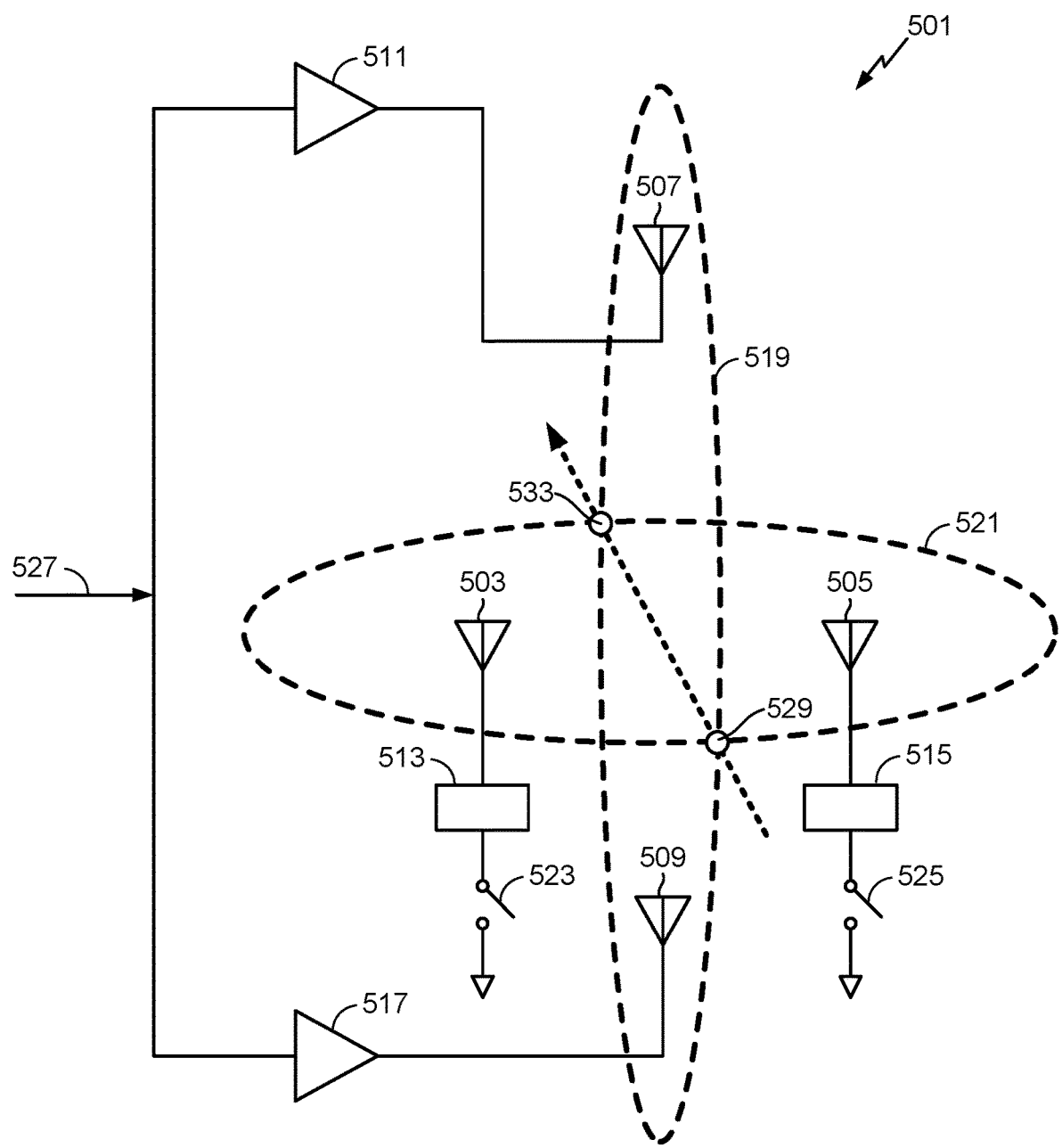
FIG. 5 is an illustration of a four antenna system, having two driven and two parasitic antennas, such as may be used for 3-dimensional beam steering.

FIG. 5 is an illustration of a four antenna system 501, having two driven antennas 507 and 509 and two parasitic antennas 503 and 505, such as may be used for 3-dimensional beam steering. FIG. 5 also illustrates that not all antennas need be actively driven. Driven antennas 507 and 509 are driven by power amplifiers 511 and 517 respectively. Parasitic antennas 503 and 505 may be essentially eliminated from the antenna configuration if switches 523 and 525 are open. However if switches 523 and 525 are closed then parasitic antennas 503 and 505 are coupled through tuning networks 513 and 515 to ground. Once switches 523 and 525 are closed, driven antennas 507 and 509 may cause a resonance in parasitic antennas 503 and 505. The frequency of this resonance will be the same as frequency of driven antennas 507 and 509, which are driven by the same signal 527. However the phases of the resonances of parasitic antenna 503 and 505 can be adjusted by tuning networks 513 and 515. Tuning networks 513 and 515 may be adjusted by using varying inductances and capacitances. Those variables may be adjusted electronically using components that react to electrical signals, such as switching capacitances and/or inductances in and out of the circuitry within tuning networks 513 and 515, or using electrically adjustable components such as varactor diodes. Once switches 523 and 525 are closed, parasitic antennas 503 and 505 will start to resonate at the frequency of signal 527. Because parasitic antennas 503 and 505 resonate, they will reradiate energy with the phase shift introduced by tuning networks 513 and 515. This will essentially make the antenna system of FIG. 5 a two dimensional beam steering system as in FIG. 4. A common term for unpowered antennas that resonate with power antennas, then reradiate a portion of that resonance energy at a phase delay determined by a tuning network coupled to the unpowered antennas is "reactive directed array." The power is reactive because it is a reaction to powered antennas, and the power re-radiated is directed by the tuning network coupled to each of the antennas.

In FIG. 4, the antennas 407 403 405 and 409 may be driven with any amount of power that the power amplifiers, 411, 413, 415 and 417 can deliver. For example, in FIG. 4, antennas 407 and 409 can create constructive interference represented by 421, similarly antennas 403 and 405 can create constructive interference represented by 419. By using the antennas in a quadrature arrangement beam steering in 3-dimensions can be achieved. Of course many more reactive, or even powered, antennas may be used in order to further refine the beam steering capabilities, range capabilities or for other reasons.

Range extenders commonly rely on adding a beam steering front end that directs the beam for improved channel SNR (Signal to Noise Ratio). Additionally having multiple power amplifiers can provide signal, thereby extending the range beyond that that can be achieved by a single power amplifier and omnidirectional antenna. However, the additional hardware cost to support multiple RF paths, phase shifters and Power Amplifiers to feed antennas is usually high. Implementation of phase and amplitude control in the RF path is challenging and often implemented with analog phase shifters or complex digital phase shifters, which require high speed, high throughput and high power consumption, at least in a portable device which has limited battery power. Accordingly antenna tuning with reactive elements can be used to take advantage of being able to beam steer with a single powered antenna using reactively coupled directed antenna(s) to create a beam. If the antenna system has more than one antenna a second antenna may be a powered or reactive antenna or switchable. When a Power Amplifier is not feeding an antenna these antennas can be reactive loads and, appropriately loaded may be used for beam forming purposes even though not actively powered. Reactive directive arrays is a known method that uses reactive tuning elements and resonant antennas to provide beam steering and directivity. Using such arrays beam forming can be accomplished using one active PA; along with reactively loaded (parasitic) antennas particularly if the reactive tuning of the resonant antennas is variable. Depending on how the system is used in terms of directivity we would like to be able to configure our antennas and PA accordingly and achieve an acceptable communications link using less power. These and other aspects of the concepts herein will be discussed with respect to the following figures.

In FIG. 5, parasitic antennas 503 and 505 can be designed to resonate at the same frequency that driven antennas 507 and 509 broadcast. Additionally parasitic antennas 503 and 505 can adjust the phase that they resonate at with respect to the phase of signals from driven antennas 507 and 509 using tuning networks 513 and 515 when they are activated using switches 523 and 525 respectively. Since antennas are not actively driven by power amplifiers the amount of power that parasitic antennas 503 and 505 can re-radiate is limited by the amount of power they receive from driven antennas 507 and 509. The re-radiated power from antennas 503 and 505 however will still affect the beamforming function of the antenna system. By adjusting tuning networks 513 and 515 the direction of the radiated beam (the "radiated beam" or "beam" is a spatial locality where constructive interference increases the signal significantly).

In FIG. 5, 521 represents the zone of constructive interference from driven antennas 507 and 509. In FIG. 5, 519 represents the zone of constructive interference from parasitic antennas 503 and 505. The space where the zones of constructive interference 521 and 519 constructively interfere with each other, as represented by 533 and 529 are the locations where the beam is at its strongest.

FIG. 5 is an exemplary system, A practically infinite variation of antenna system arrangements and configurations are possible. For example in the four antenna system 501 both driven antennas 507 and 509 were powered antennas driven by power amplifiers 511 and 517. That need not be the case. For example driven antenna 509 could have also been a passive antenna similar to parasitic antennas 503 or 505. Additionally the system discussed above might have parasitic antenna 503 as a powered antenna. For ultimate flexibility all antennas could be switchable between powered and parasitic modes, but obviously a minimum of one must be powered.

Additionally more parasitic antennas 503 and 505 can be added to capture and reradiate the energy provided by the powered antennas. In the drawings herein the drawings depict antennas which are numbered. Instead of each antenna depicted being a single antenna each depiction may represent a group of antennas. For example there is parasitic antenna 503 might a group of parasitic antennas instead of only one. Some individual designs may gain advantages from an array of parasitic antennas some other designs may require only one parasitic antenna. From a practical standpoint one reason parasitic antennas may be added instead of simply adding more driven antennas is that, generally speaking adding driven antennas adds to power consumption and system complexity.

Figure 6:
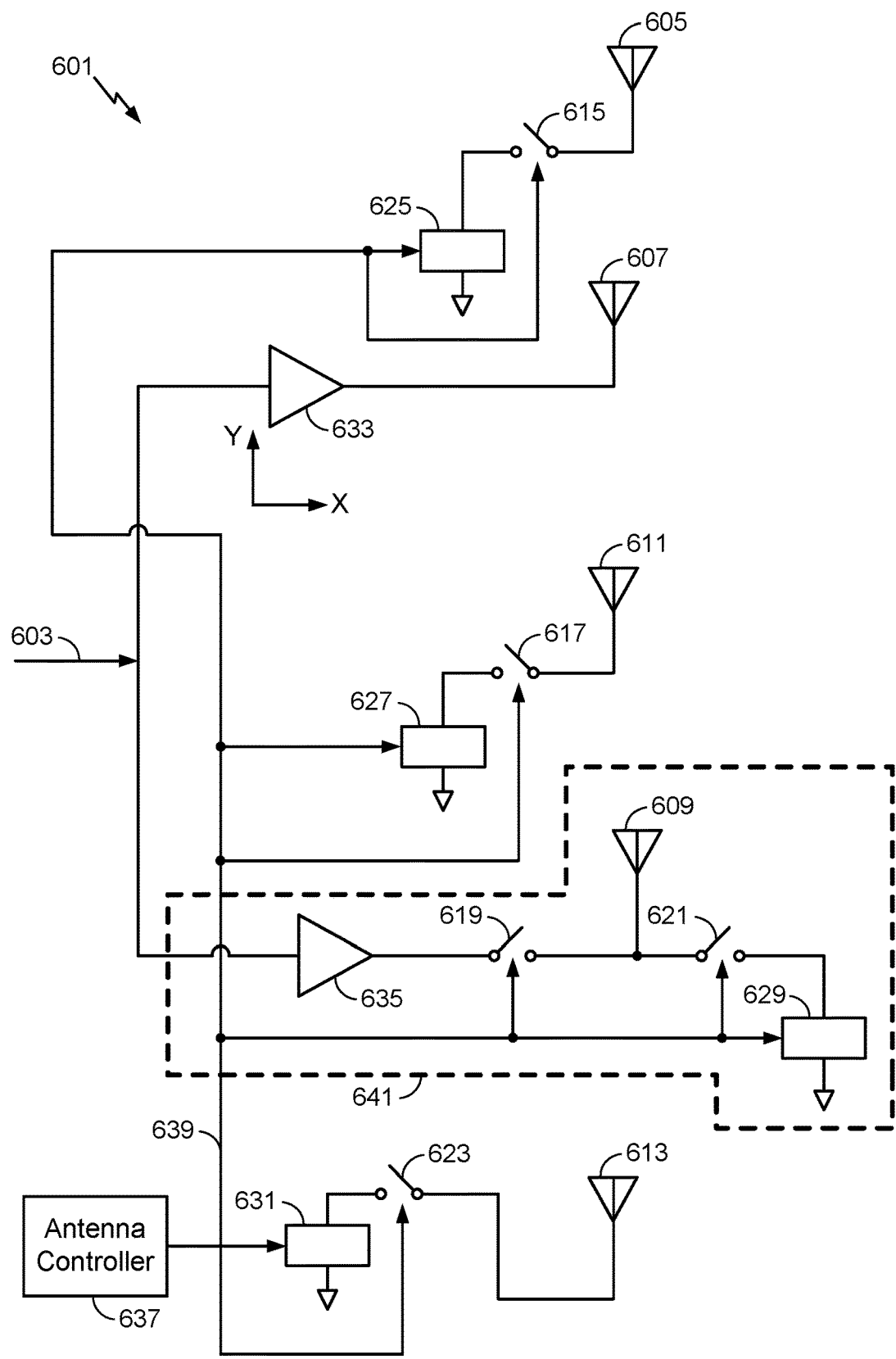
FIG. 6 is an illustration of a five antenna system which will be used to explain some of the aspects of the present disclosure.

FIG. 6 is an illustration of a five antenna system 601 which will be used, concurrently with FIGS. 7, 8, 9A and 9B to explain some of the aspects of the present disclosure.

Figure 7:
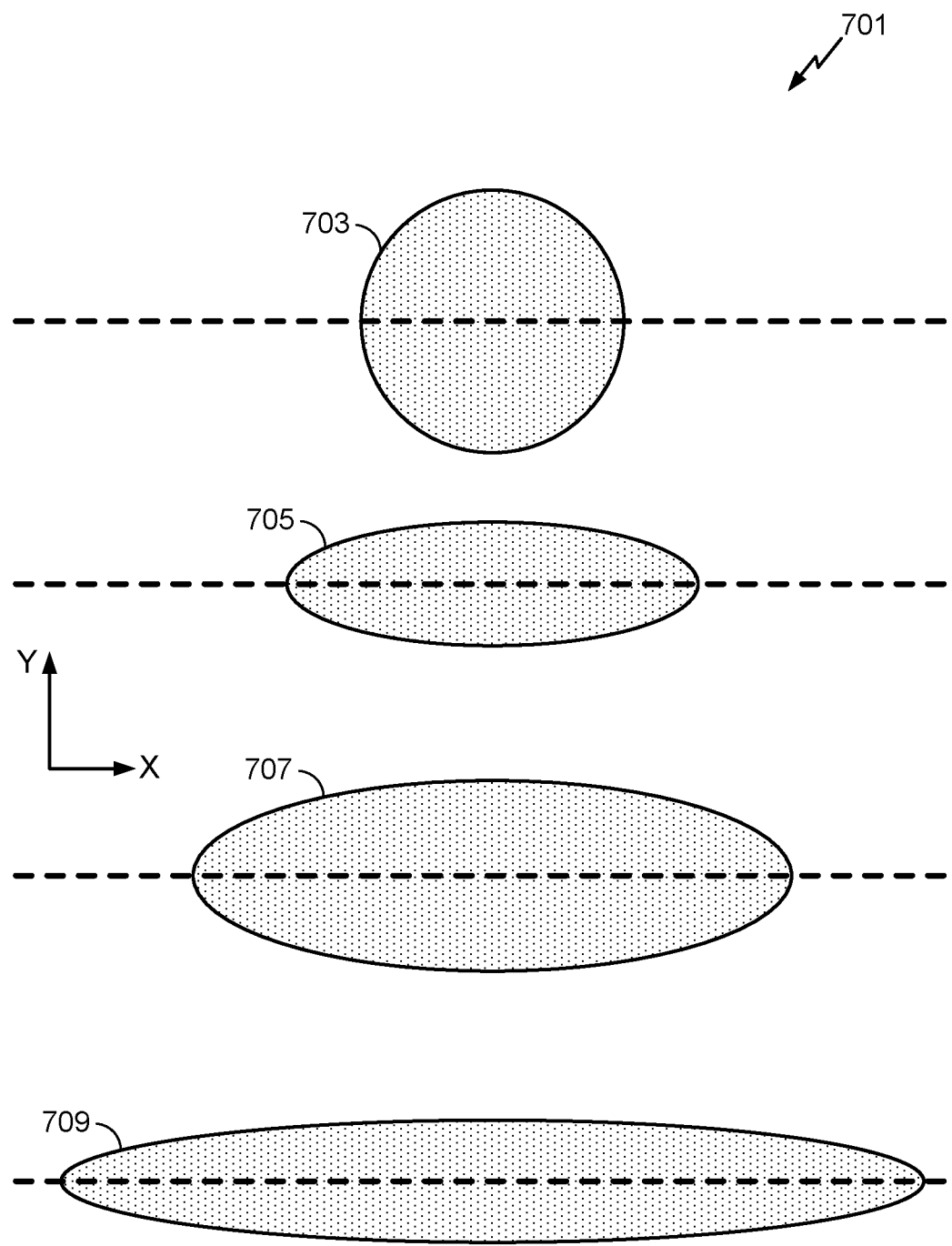
FIG. 7 is a graphical representation of areas of constructive interference, as may be produced by different illustrative configurations of the antenna system of FIG. 6.

FIG. 7 is a graphical representation 701 of areas of constructive interference, as may be produced by different illustrative configurations of the antenna system of FIG. 6 to explain some aspects of the present disclosure. They are not intended to be scale, but rather to impart a relative comparative understanding of the different antenna configurations that may be created according to aspects of the present disclosure.

In FIG. 6 a five antenna system 601 is depicted. The arrangement illustrated in FIG. 6 will be used for purposes of illustration and description, a virtually infinite number of configurations are possible, limited only by practical considerations.

The five antenna system 601 of FIG. 6 can be used in a variety of configurations, for example, to accomplish range extension using beam steering of signal 603.

Assume that FIG. 7 represents patterns of maxima of signal strength of the five antenna system 601 of FIG. 6 in several configurations. Further assume that any points outside of the gray area are points where the five antenna system 601 cannot reach its intended receiver with an acceptable signal. The patterns of maxima are different sizes and shapes to illustrate different aspects of the teachings herein, however they are conceptualizations are not intended to represent actual signal strength charts.

The five antenna system 601 of FIG. 6 will be used to illustrate an antenna system having four separate antenna configurations. In a first configuration, only antenna 607 is driven and no other antenna is active. Since only one antenna is active no beam forming can take place and the points where an acceptable signal can be found form a circular pattern 703 and an acceptable signal can be found in the interior (gray area) of pattern 703.

Assume that the antenna system cannot achieve an acceptable connection with its intended receiver in the first antenna configuration; a second configuration can be tried. In the second configuration, antennas 605, 607 and 611 are used. Antenna controller 637 may control a variety of devices. For example the antenna controller 637 may control the gain and phase delay in power amplifiers, such as 633 and 635, and switches 615, 617, 619, 621, and 623. In the second configuration, switch 615 is closed by the antenna controller 637 using Control Bus 639. The antenna controller 637 may also select from several tuning parameters in tuning element 625. Tuning element 625 may have variable tuning elements which can be selected by the antenna controller 637. In the second configuration, switch 617 is closed by the antenna controller 637 using control bus 639. The antenna controller 637 may also select from several tuning parameters present in tuning elements 627, 629 and 631.

In the second configuration, there is still only one antenna, 607, coupled to an active power amplifier 633. However parasitic antennas 605 and 611 can serve as reactively directed antennas once they are coupled to the tuning elements 625 and 627. In such a case the zone where an acceptable communication link can be established is represented as the grey area inside 705 in FIG. 7. Generally shape 705 is narrower, illustrating that some of the energy transmitted along the width has been absorbed by parasitic antennas 605 and 607 hence the narrowing of the pattern. The pattern of shape 705 however is longer in width as the parasitic antennas 605 and 607 have been tuned to augment the width of the pattern in order to extend the range of the antenna system. If the second configuration cannot establish an acceptable communications link a third configuration may be tried. In the third configuration, antenna 607 and antenna 609 are driven by power amplifiers 633 and 635 respectively. No other antennas are used in this exemplary mode. In this third configuration, antennas 609 and 607 are both powered so the range of acceptable performance in increased and is represented in FIG. 7 as 707. Having two powered antennas can extend the range considerably, however having two powered amplifiers can consume a considerable amount of energy. If the third configuration is unable provide an acceptable communication link a fourth configuration may be tried.

In the fourth configuration, both power amplifiers 633 and 635 are on. Additionally switches 615, 617, and 623 couple tuning elements 625, 627, and 631 to antennas 605, 611, and 613 respectively. In this fourth configuration, antennas 605, 611 and 613 are tuned for beam forming. Consequentially pattern 709 in FIG. 7 can represent this fourth antenna configuration. The three parasitic antennas 605, 611, and 613 absorb some of the power provided by the powered by powered antennas 607 and 609, narrowing the height of pattern 709 with as the parasitic antennas absorb some of the energy. A portion of the power absorbed by the parasitic 605, 611, and 613 re-radiated. The three parasitic antennas 605, 611, and 613, as phase adjusted by tuning elements 625, 627, and 631 respectively, and as such can contribute to beam forming thereby lengthening the width of pattern 709 with respect to the other patterns of FIG. 7.

Antenna 609 is used in an unusual configuration 641 in that it is configured such that it may be used in 3 different modes. In the first mode antenna 609 is powered by power amplifier 635 by closing switch 619, and opening switch 621. In the second mode both switches 619 and 621 are open, and antenna 609 is essentially invisible to the overall system. In a third mode switch 619 is open and switch 621 is closed thereby coupling antenna 609 to a tuning element 628. In a third mode the antenna 609 can resonate with the powered antenna(s), and re-radiate a portion of that energy phase shifted by an amount determined by tuning element 629.

Figure 8:
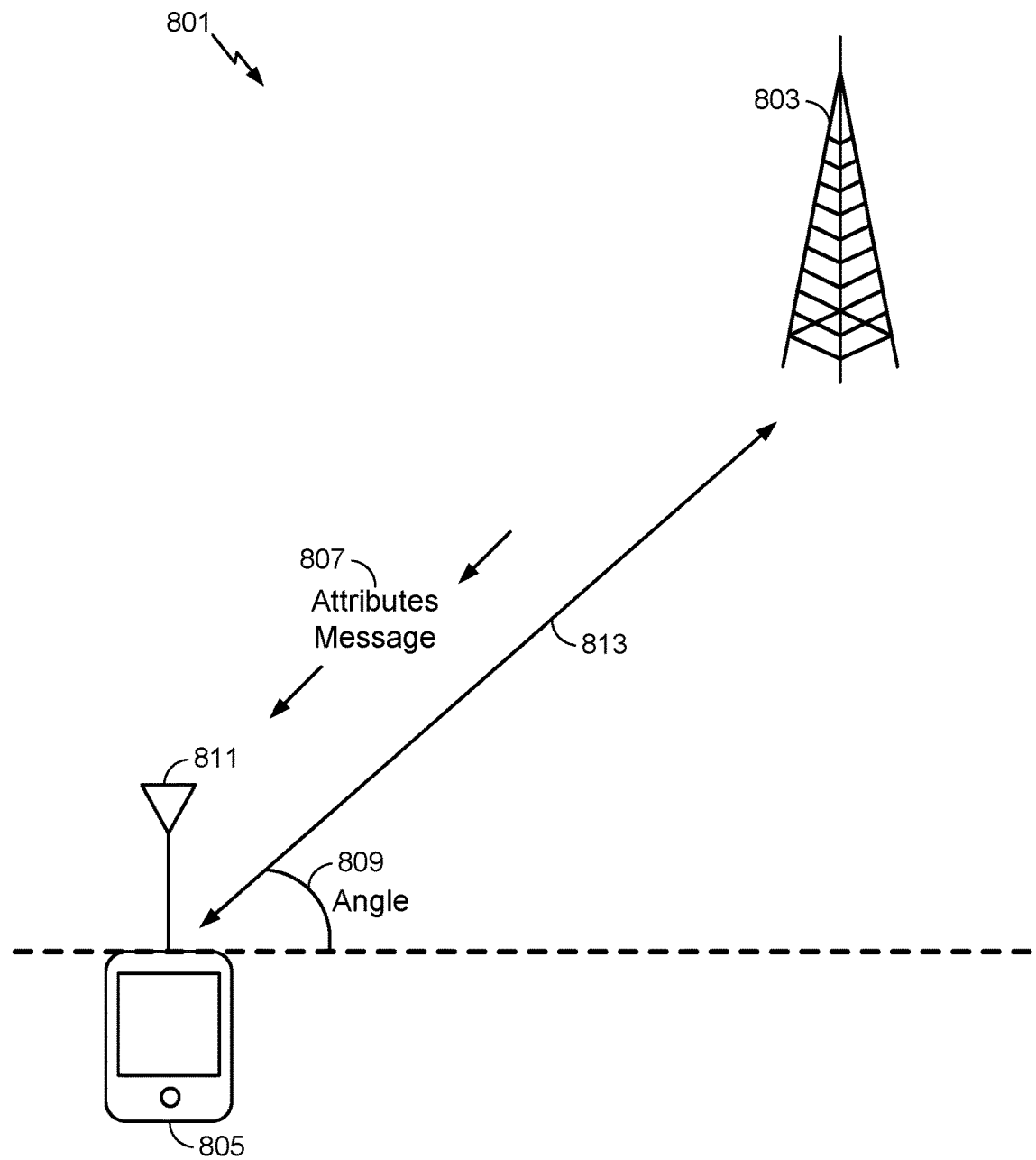
FIG. 8 is an illustration of an example communication system that may advantageously use various aspects of the teachings herein.

FIG. 8 is an illustration of an example communication system 801 that may advantageously use various aspects of the teachings herein. In the communication system 801 a broadcast tower is represented at 803. Broadcast tower 803 is communicating with mobile unit 805. 811 represents the antenna system of mobile unit 805. Although antenna system 811 only shows a single antenna it is representative of an antenna system. The antenna system may have several powered antennas. Further the powered antennas may be driven by power amplifiers that allow a phase delay to be inserted. Because phase delays can be inserted between powered antennas the antennas can be actively directed, that is can perform beam steering. Additionally parasite antennas may also be present. The parasitic antenna can be coupled into the antenna system by applying a tuning termination, such as 625 or 627. The parasitic antenna can be tuned to resonate at the same frequency as the powered antenna. Additionally, by using termination such as 625 or 627 a phase delay can be inserted into the resonance of the parasitic antenna. The resonance will then re-radiate some of its resonance energy at a phase angle (with respect to the powered antenna) which will in turn allow the beam formed by the re-radiation of resonance energy to be directed just as a beam from a powered pair of antenna might. The antenna system then comprises two components. A first actively directed array, formed by the driven antennas and phase delays inserted, and a second reactively directed array formed by the parasitic antennas and tuning elements, which allow the reradiated beam from the parasitic antenna to be steered.

The angle of communication 809 represents the angle between the antenna systems of the mobile unit 805 and broadcast tower 803. In certain implementations a communication system tower may provide an attributes message 807. A number of pieces of information may be included in the attributes message. An attributes message can be useful in deciding whether a communications link is satisfactory. It may contain variables such as received power, signal to noise ratio, quality of service, angle of reception i.e. 809, transmitted power, GPS location of the broadcast tower 803, and a number of other various attributes describing how the broadcast tower 803 is receiving the signal from mobile unit 805 as well as providing information about the broadcast tower 803, such as location transmitted power, etc.

The attributes can be used, in one aspect, to decide if an acceptable communications link can be established. For example the acceptability of a communication link 813 in the present example illustrated in FIG. 8 and described with support from FIGS. 6 and 7 and others. In FIG. 8 the broadcast tower 803 provides an attributes message to the mobile unit 805. The attributes message 807 will contain information about a transmission from the mobile unit 805 as well as data concerning broadcast tower 803. The mobile unit 805 can then use information from the attributes message to help the mobile unit 805 establish an extended range which is economical in terms of battery power use. The attributes message from the broadcast tower 803 may contain: received power, signal to noise ratio of received power, QOS (Quality Of Service), received angle of transmission, location of the broadcast tower, location of nearby broadcast tower and a host of other information. The mobile unit 805 can use the information or a subset of the information provided in the Attributes Message 807 to decide if the communications link 813 between the mobile unit 805 and the broadcast tower 803 is satisfactory or it should change antenna 811 configurations to attempt to achieve an acceptable communications link 813. It should be noted that antenna 811, although drawn as a single antenna, represents an antenna system and may actually contain a plurality of physical antennas. Conversely, the mobile sys unit tem 805 may also use the attributes message to attempt to establish an acceptable communications link 813 at reduced power cost, but for the sake of simplicity the emphasis will be on finding an economical (in terms of power consumption) communication link 813 that is satisfactory. What actually is a satisfactory communications link 813 will depend on the application, and a communications link that is satisfactory for one application may be completely inadequate for another and may be excessive for a third. A factor that is important in one application can be relatively unimportant in a second application and vice-versa. What actually constitutes an acceptable communication link 813 in any particular application is not within the scope of this application.

Figure 9A:
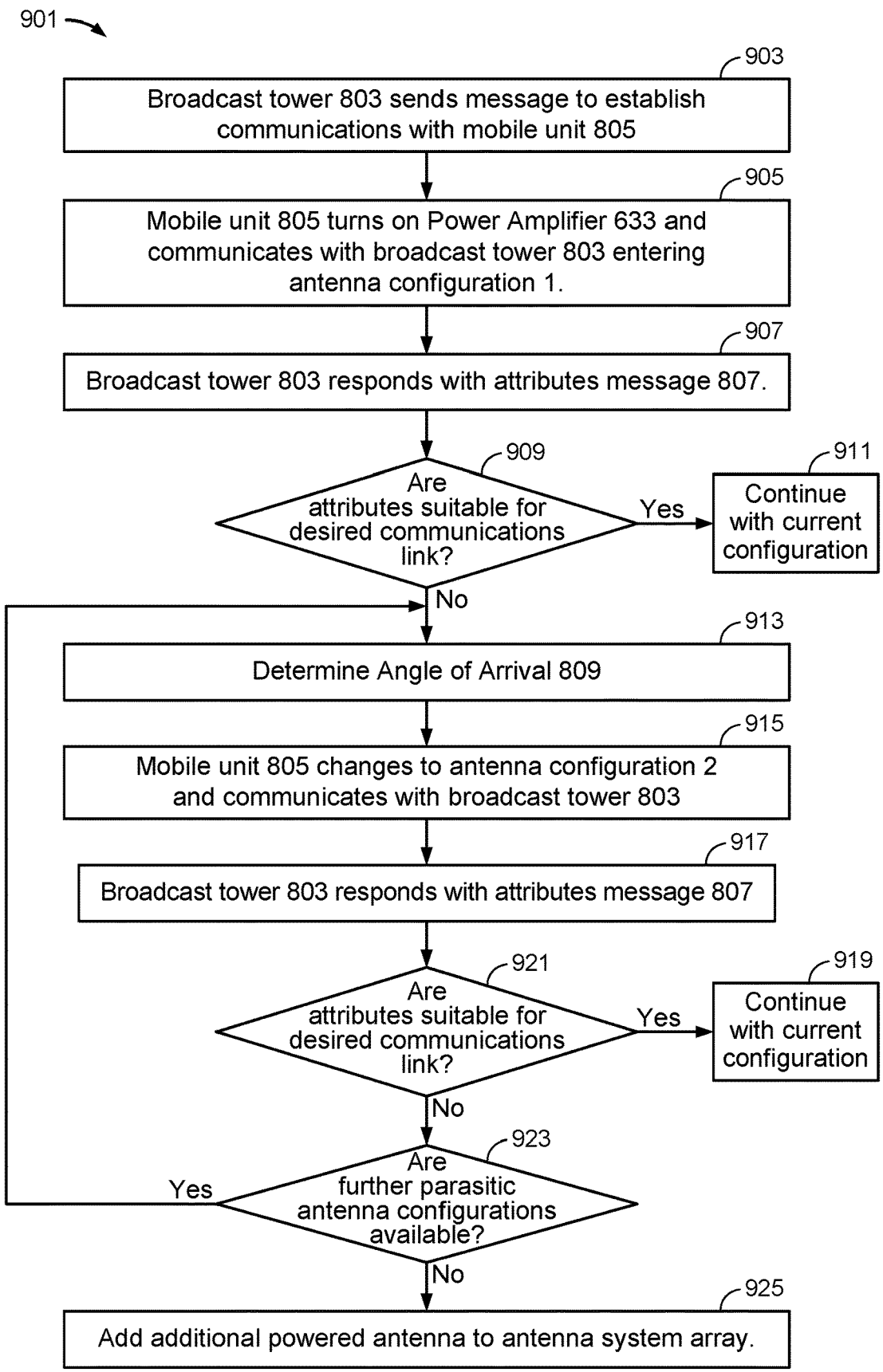
FIG. 9A is a first portion of a flowchart illustrating aspects of an exemplary system employing the teachings herein.

FIG. 9A is a first portion of a flowchart illustrating aspects of an exemplary system employing the teachings herein.

Figure 9B:
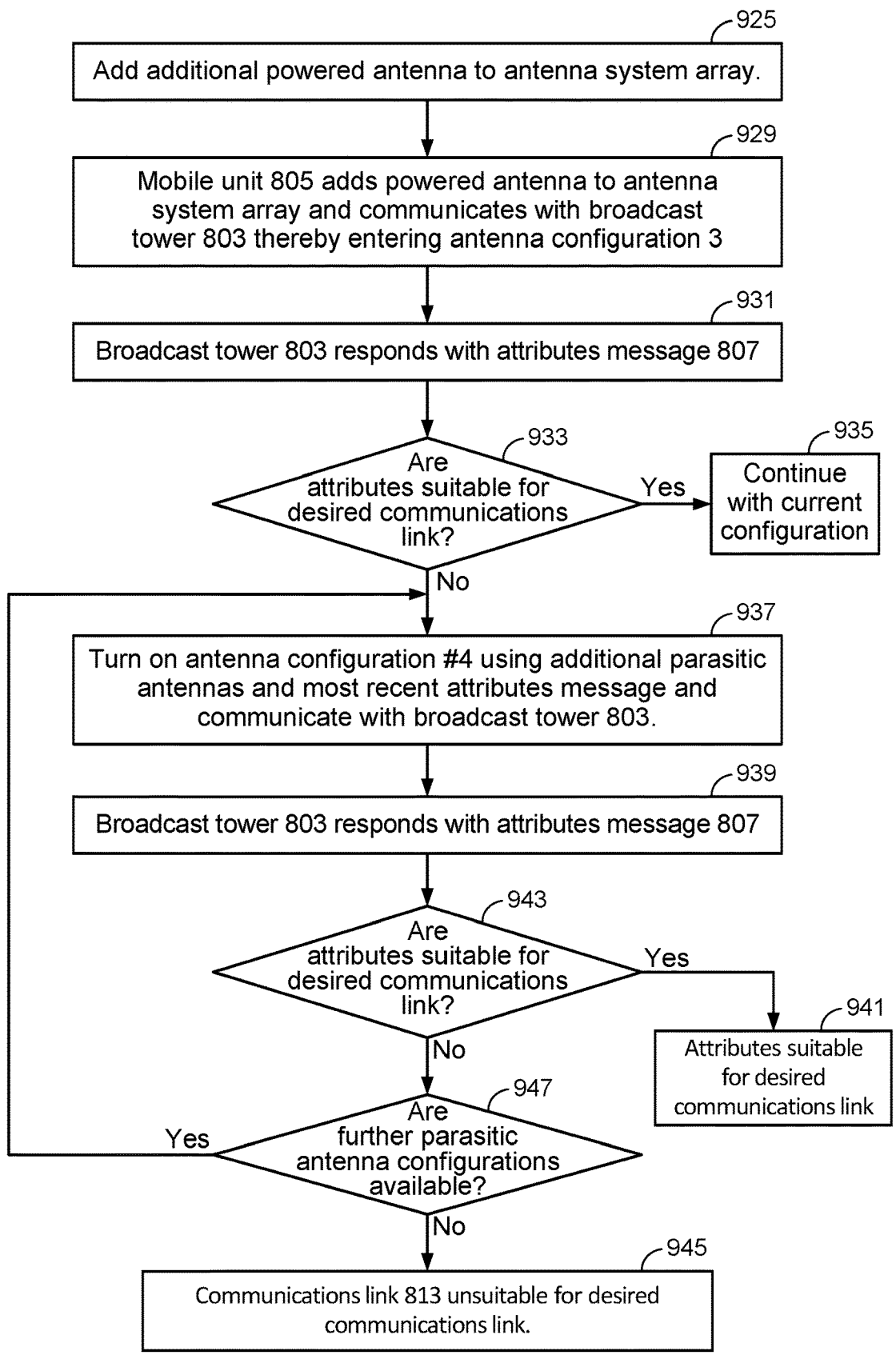
FIG. 9B is a second portion of a flowchart illustrating aspects of an exemplary system employing the teachings herein.

FIG. 9B is a second portion of a flowchart illustrating aspects of an exemplary system employing the teachings herein. FIGS. 9A and 9B, taken together, illustrate an embodiment in which a mobile unit 805 is attempting communication with a broadcast tower 803 and is trying to establish a satisfactory communication link 813. It may be useful to think of the example in FIG. 8 as a cell phone communicating with a cell tower, however in the description that follows no such assumption is made and the communication system in FIG. 8 can represent a variety of systems.

FIGS. 9A and 9B are flow charts which describe an exemplary use of many of the teachings herein. Many variations and tweaks of the process described in FIGS. 9A and 9B are possible so the described process should not be regarded as the only or even the best way of using the disclosed teachings herein, they are designed to be illustrative and not exclusive. The method of FIGS. 9A and 9B is described illustratively with respect to FIG. 6.

In block 903, the exemplary process 901 of seeking an acceptable communications link 813 begins when broadcast tower 803 sends a message to establish communications with mobile unit 805. Control then passes to block 905.

In block 905, mobile unit 805 turns on power amplifier 633 and communicates with broadcast tower 803 thus entering the first configuration. This is a minimal power setting, with only power amplifier 633 and antenna 707 active. The beam is symbolically represented by FIG. 703 as the power amplifier 633 has just been turned on and, in the present example in antenna configuration, no beam steering control has been implemented as only one antenna is active. At this point angle 809 is unknown since the broadcast tower has not received a transmission from mobile unit 805. The mobile unit 805 then broadcasts equally in all directions using only antenna 707 to communicate with the broadcast tower 803. The antenna system 811 of the mobile unit 805 is in antenna configuration 1 broadcasting with only a single powered antenna 707 and no parasitic antenna(s). Control then passes to block 907.

In block 907, broadcast tower 803 responds with an attributes message 807 indicating that the broadcast tower 803 has received the transmission from the mobile unit 805 and knows the antenna system of the mobile unit 805 has entered a new configuration. As previously discussed the attributes message 807 may contain a variety of information. In the present example the attributes message 807 may contain all the information that is necessary for mobile unit 805 to decide whether an acceptable communications link 813 has been attained. The mobile unit 805 may use a number of criteria to decide as to whether a satisfactory communications link 813 has been established. The criteria as to whether a satisfactory link has been attained can come from the attributes message, the general communications environment (such as received signal strength, signal to noise ratio of the signal received by the mobile unit or a combination of both. What constitutes a satisfactory communications link 813 is dependent on the use to which it will be put and may vary widely from one application to another. Once the broadcast tower 803 responds with attributes message 807 control passes to block 909.

In block 909, the attributes message is examined and a judgment as to whether the communications link 813 is acceptable is made. If the attributes are suitable to create an acceptable communications link 813 then in block 911 the process stops and the current configuration is used. If the communications link 813 is not acceptable then the antenna system 811 can attempt to reconfigure. In the present example control passes to block 913.

In block 913, the angle of arrival 809 is determined. This may be done by placing this information in the attributes message 807 that is sent from the broadcast tower 803 to mobile unit 805. It may also be done within the mobile unit 805 by observing a time difference in arrival of a communication link 813 broadcast from the broadcast tower 803 by two separate receiving antennas within the antenna system 811 located within the mobile unit 805. Additionally other methods of finding the angle of arrival 805 (also known as the angle of reception) are known and may be equivalently used. Once the angle of arrival 809 is determined in block 913 control may pass to block 915.

In block 915, the second antenna configuration 811 is entered. In the second configuration only one antenna 607 is powered and parasitic antennas 605 and 611 are coupled, via switches 615 and 617 to tuning elements 625 and 627 respectively. Tuning elements 625 and 627 are adjusted so the antenna system beam pattern is elongated via beam steering, illustrated conceptually at 705, to point more power at the broadcast tower 803. In this case parasitic antennas 605 and 611 form a reactive directed array, in which antennas 605 and 611 are coupled into the antenna system 811 by achieving a resonance (the reactive part) with antenna 607 and tuning elements 625 and 627 which are tuned (the directed part) to point the antenna system 811 beam towards broadcast tower 803. Control is then transferred to block 917.

In block 917, the broadcast tower responds to the antenna configuration change with an updated attributes message 807. Then control is transferred to block 921.

In block 921, portions of the attributes message are examined to help determine whether an acceptable communications link 813 has been established. If the communications link is acceptable control is transferred to block 919 and the communications link continues with the current configuration. If the communications link is not acceptable then control is transferred to block 923.

In block 923, other parasitic antennas may be added to the antenna system array if there are additional parasitic antennas that have not yet been added. For example antenna 613 can be added to the system at this point if it has not already been added. Accordingly if further parasitic antenna configurations may be added to the antenna system control is transferred to block 913. If no more parasitic antennas are available to add to the antenna array control is transferred to block 925.

In block 929, antenna configuration 3 is entered. In the present example that means using power amplifiers 633 and 635 to drive antennas 607 and 609 respectively. That will increase the areas of effective communication of the communication system 801, as graphically illustrated at 707 in FIG. 7. Since there is now at least a second powered antenna, the signal to the second power amplifier 635 can be phase delayed and the antenna beam aimed at the broadcast tower using its last known position. In block 931 the mobile unit 805 then sends a message to the broadcast tower 803 indicating that antenna system 811 is in configuration 3. Control then passes to block 933.

In block 933, a decision is made as to whether the communications link 813 is acceptable. If the communications link 813 is judged acceptable then block 935 is entered and the communication link 813 is judged as acceptable for use.

If in block 933 the mobile unit 805 decides that a satisfactory communications link 813 has not been established. If the current communications link 813 is not control is transferred to block 937 where the antenna system is changed to configuration 4 and a message indicating that the antenna system has changed configurations, and is now in configuration 4, is sent to broadcast tower 803. In configuration 4 all antennas 605, 607, 611, 609 and 613 are used. Antennas 607 and 609 are powered, and the remaining parasitic antennas 605, 611, and 613 are tuned using tuning modules 625, 627 and 629. Pattern 709 in FIG. 7 represents configuration 4. The pattern 709 of constructive interference is narrower; indicating some of the previous power used to power antennas 607 and 609 is being used to resonate the parasitic antennas 605, 611, and 613. Additionally pattern 709 is wider because the zone of constructive interference is augmented by the tuned resonance of the added parasitic antennas which steers the beam towards the broadcast tower 803 target and adds constructive interference. Control is then transferred to 939.

In block 939, broadcast tower 803 responds with an attributes message 807 and control is then transferred to block 943. In block 943 the communications link 813 is evaluated to see if satisfactory performance has been achieved . . . . If satisfactory performance has been achieved then control is transferred to block 941 where the current satisfactory antenna configuration is used.

If block 943 does not find a satisfactory communications link 813 control passes to block 947.

In block 947, it is determined whether further parasitic configurations are available, that is are there further parasitic antenna that can be added to the system? If there are further parasitic antennas that can be added, control is transferred to block 937 to add more parasitic antennas to the antenna system. If, in block 947 there are no further parasitic elements to add to the antenna system 811 then control transfers to block 945 and the communication system has failed to establish a satisfactory communications link.

The illustrative process 901 has been simplified to enhance understanding. In process 901, the antenna system 811 has f configurations and the process increments through successive configurations until a satisfactory communication link 813 is established or until the process 901 is unable to establish a satisfactory communications link. In an actual system each antenna configuration could have many sub configurations. For example in configuration 1 the setting of power amplifier is likely to have multiple power levels. In such a case it is likely that power amplifier 633 will be started at a low level and the power level increased to a maximum value prior to entering antenna configuration 2. Similarly in antenna configuration 2 the number of parasitic antennas used as reactive directed array elements may be variable as well similarly to the variable amounts of power directed to antenna 607 by power amplifier 633.

Configuration 3 is similar to configuration 1 except that two power amplifiers 633 and 635 are used the first time configuration 3 is entered. The power level of amplifiers 633 and 635 may both be varied.

Configuration 4 is similar to configuration 2 in that both the power of the amplifiers and the number of parasitic elements comprising a reactive directed array may be varied. If the system is in configuration 4 and all the powered antennas are receiving maximum power and all the parasitic antennas have been included in the antenna system and the antenna system still cannot establish a satisfactory communications link 813 then the system is not suitable for use in the present application.

Process 901 is illustrative of how the range of a communications link might be extended in steps so as to extend the range in a way economical to the power consumption of the mobile unit 805. Power consumption is an important consideration in portable devices, but even in fixed devices power consumption should be a consideration.

Those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such choices are implementation decisions which should not be interpreted as causing a departure from the scope of the present disclosure.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Additionally the "processor" can take a variety of forms from an elementary state machine to an internet connection having access to cloud computing resources. What form it takes commonly may depend on the environment and design and implementation requirements.

While the present disclosure shows illustrative aspects of the invention, it should be noted that various changes and modifications could be made herein without departing from the scope of the invention as defined by the appended claims. Furthermore, although elements of the invention may be described or claimed in the singular, the plural is contemplated unless limitation to the singular is explicitly stated.

What is claimed is:

1. A method of controlling a configuration of an antenna system to provide a satisfactory communication link with a target, the method comprising:
    turning on a first powered antenna, thereby entering a first configuration of the antenna system;
    determining if the first configuration of the antenna system can provide the satisfactory communication link with the target; and
    if the first configuration of the antenna system cannot provide the satisfactory communication link entering a second configuration of the antenna system, wherein in addition to the first powered antenna at least one further antenna is used to form a portion of a directed array in order to steer a beam of the antenna system towards the target, the further antenna comprising an antenna that is selectably configurable into a powered mode in which the further antenna operates as a second powered antenna in the second configuration of the antenna system, or a resonating mode in which the further antenna operates as a directionally tuned parasitic antenna in the second configuration of the antenna system, the further antenna also having an inactive mode in which the further antenna is disconnected from the antenna system in the first configuration of the antenna system.

2. The method of claim 1 wherein determining if the first configuration of the antenna system can provide the satisfactory communication link with the target further comprises examining an attributes message from the target; and deciding, at least partly based on information in the attributes message, whether the communication link with the target is satisfactory.

3. The method of claim 2 wherein, the at least one further antenna is directionally tuned based on the attributes message.

4. The method of claim 1 further comprising, if the communication link with the target is not satisfactory in the second configuration of the antenna system then entering a third configuration of the antenna system in which at least two directed powered antennas and no parasitic antennas are used, wherein at least one of the two directed powered antennas comprises the further antenna.

5. The method of claim 4 further comprising deciding if the third configuration of the antenna system can produce a communications link with the target that is satisfactory.

6. The method of claim 4 further comprising using a phase delay between the at least two directed powered antennas to steer the beam of the antenna system towards the target.

7. The method of claim 6 wherein the attributes message is used to determine a direction to use to steer the beam of the antenna system towards the target.

8. The method of claim 4 wherein determining if the third configuration of the antenna system can provide the satisfactory communication link with the target further comprises examining an attributes message from the target; and deciding, at least partly based on information in the attributes message, whether the communication link with the target is satisfactory.

9. The method of claim 8 wherein deciding if the third configuration of the antenna system can produce a communications link with the target that is satisfactory further comprises deciding based on, at least partly, the attributes message.

10. The method of claim 9 wherein if the third configuration of the antenna system cannot produce a satisfactory communications link a fourth configuration of the antenna system is entered having at least one tuned parasitic antenna.

11. The method of claim 10 wherein the tuning depends at least partly on the attributes message.

* * * * *